US009667310B2

(12) United States Patent
Koppelaar et al.

(10) Patent No.: US 9,667,310 B2
(45) Date of Patent: May 30, 2017

(54) EFFICIENT RAKE RECEIVER FINGER SELECTION

(71) Applicant: NXP B.V., Eindhoven (NL)

(72) Inventors: Arie Geert Cornelis Koppelaar, Eindhoven (NL); Andries Pieter Hekstra, Eindhoven (NL); Frank Harald Erich Ho Chung Leong, Eindhoven (NL); Stefan Drude, Eindhoven (NL); Marinus van Splunter, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/923,871

(22) Filed: Oct. 27, 2015

(65) Prior Publication Data

US 2017/0117934 A1   Apr. 27, 2017

(51) Int. Cl.

| H03D 1/06 | (2006.01) |
|---|---|
| H03D 1/04 | (2006.01) |
| H03K 5/01 | (2006.01) |
| H03K 6/04 | (2006.01) |
| H04B 1/7117 | (2011.01) |
| H04B 1/10 | (2006.01) |

(52) U.S. Cl.
CPC ......... *H04B 1/7117* (2013.01); *H04B 1/1081* (2013.01)

(58) Field of Classification Search
CPC .................. H04B 1/7117; H04B 1/1081
USPC ........................................................ 375/348
See application file for complete search history.

(56) References Cited

U.S. PATENT DOCUMENTS

| 7,369,523 | B2 * | 5/2008 | Papasakellariou ... | H04B 1/7107 370/328 |
|---|---|---|---|---|
| 2002/0110109 | A1 * | 8/2002 | Kawaguchi .......... | H04B 1/7115 370/342 |
| 2006/0056496 | A1 * | 3/2006 | Smee ................... | H04B 1/7115 375/148 |
| 2008/0084946 | A1 | 4/2008 | Clessienne et al. | |
| 2008/0310485 | A1 * | 12/2008 | Soliman ............... | H04B 1/7115 375/147 |

OTHER PUBLICATIONS

Hongsan Sheng, Alexander M. Haimovich, Impact of Channel Estimation on Ultra-Wideband System Design, IEEE journal of selected topics in signal processing, vol. 1, No. 3, Oct. 2007.*
Proakis, John G., Digital Communications, "Digital Communications through Fading Multipath Channels—Diversity Techniques for Fading Multipath Channels", 3rd edition, McGraw-Hill, pp. 777-806 (1995).

(Continued)

*Primary Examiner* — Tanmay Shah
(74) *Attorney, Agent, or Firm* — Rajeev Madnawat

(57) ABSTRACT

A receiver for receiving an input signal is disclosed. The receiver includes a processor, a memory, a plurality of sub-receivers configured to receive a plurality of versions of the input signal through a plurality of transmission channels, a sub-receiver selection module configured to select one more of the plurality of sub-receivers using expected contributions to signal-to-noise (SNR) of an output signal based on an uncertainty of the estimated contributions. The receiver also includes a combiner to combine outputs of the selected sub-receivers to produce the output signal.

14 Claims, 4 Drawing Sheets

(56) References Cited

OTHER PUBLICATIONS

Ahmadian, Z. et al. Performance Analysis of the IEEE 802.15.4a UWB System, IEEE Ttrans. on Communications, vol. 57, No. 5, pp. 1474-1485 (May 2009).
Sheng, H. et al. Impact of Channel Estimation on Ultra-Wideband System Design, IEEE Journal of Selected Topics in Signal Processing, vol. 1, No. 3, pp. 498-507 (Oct. 2007).
Halford, S. et.al., "Evaluating the Performance of HRb Proposals in the Presence of Multipath", IEEE 802.11-00/282r1 (Sep. 2000).
Lioumpas, A. S. et al. "Adaptive generalized selection combining (A-GSC) receivers", IEEE Transactions on Wireless Communications, vol. 7, No. 12, pp. 5214-5219 (Dec. 2008).
Yue, L. "Analysis of generalized selection combining techniques", IEEE 51st Vehicular Technology Conference Proceedings, Tokyo, pp. 1191-1195 (2000).
Cao, L. et al. "Effects of channel estimation errors on absolute threshold-generalized selection diversity combining," IEEE International Conference on Communications, pp. 2200-2206 (2005).
Zhou, L. et al. "Weighted Rake receiver for UWB communications with channel estimation errors", IEEE Proceedings. International Conference on Communications, Circuits and Systems, pp. 437-440 (2005).
Kong, N. et al. "SNR of generalized diversity selection combining with nonidentical Rayleigh fading statistics", IEEE Transactions on Communications, vol. 48, No. 8, pp. 1266-1271 (Aug. 2000).

\* cited by examiner

EFFICIENT RAKE RECEIVER FINGER SELECTION

BACKGROUND

A RAKE receiver is a radio receiver designed to counter the effects of multipath fading. A signal transmitted from a transmitter encounters physical objects such as buildings, trees, etc. that cause multiple time delayed signals being received at a receiver due to reflection, diffraction, or scattering effects. A RAKE receiver uses multiple sub-receivers called fingers, each assigned to different multipath components. Each finger independently equalizes a single multipath component. The contributions of all fingers are combined in order to make the most use of the different transmission characteristics of each transmission path.

Typically, the signal of interest is coherently summed, while the noise of the different sources is assumed to be independent and therefore will be summed non-coherently. In case of two equal strength signal sources, the Signal-to-Noise Ratio (SNR) will increase by 3 dB (factor 2) after combining (signal amplitude will be doubled, therefore signal energy will be 4-fold while noise energy after addition will b e 2-fold).

In a traditional RAKE receiver, multipath propagation is exploited by collecting signals from individual multipath components and coherently adding them together. This adding or summing of signals leads to the use of more radiated energy from a transmitter. To effectively sum signals, an estimated channel impulse response is needed. Hence, knowledge of amplitude, phase and relative propagation delay from the most relevant multipath components has to be available to the receiver. However, the estimated channel impulse response is not perfect and differs from the true channel impulse response. The discrepancy between true and estimated channel impulse response can be modelled as an Additive White Gaussian Noise (AWGN) source whose variance is constant for all multipath components and the value of the variance of the noise that is present in channel coefficients depends on the SNR of the channel and the channel estimation parameters such as preamble size, estimation algorithm, and estimation resources. The variance can be treated as constant because typically all channel coefficients suffer from the same noise variance. The constant variance of the estimation noise causes a relative larger effect on weak multipath components than on strong multipath components. Due to channel estimation limitations, traditional RAKE receivers suffer from the following problems.

Due to estimation noise on a multipath component, the contribution of a RAKE finger to the SNR may be smaller than expected and in some cases even negative when more noise than signal is added to the combined signal. Further, in Selective RAKE (SRAKE) receivers, fingers are assigned to multipath components using the estimated channel impulse response rather than the true channel impulse response. Estimation noise may cause errors in the selection of the most promising multipath components. Moreover, the selection of multipath components is performed without taking channel statistics into account. A multipath component with a larger delay will likely have a smaller amplitude than a multipath component with a smaller delay.

FIG. 1 shows achieved SNR as a function of the number of used RAKE fingers, depicted in several scenarios. The curves are achieved using one realization of the exponential channel model, simulating a channel with an RMS delay spread of 50 ns. The best performance is achieved when a perfect channel estimate is present, which is (of course) a hypothetical scenario. In the hypothetical scenario, the SRAKE curve 100 shows the fastest growing SNR curve as function of the number of RAKE fingers. The Partial RAKE (PRAKE) curve 102 shows that without selecting/ordering the RAKE fingers, more RAKE fingers are required for achieving a specific SNR. Both the SRAKE curve 100 and PRAKE curve 102 show that after reaching a certain point, SNR does not increase with the addition of more RAKE fingers. In fact, as shown by curves 104, 106, 108, SNR actually decreases when more RAKE fingers are added, due to the estimation noise and addition of more noisy multipath components.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a receiver for receiving an input signal is disclosed. The receiver includes a processor, a memory, a plurality of sub-receivers configured to receive a plurality of versions of the input signal through a plurality of transmission channels, a sub-receiver selection module configured to select one more of the plurality of sub-receivers using expected contributions to signal-to-noise ratio (SNR) of an output signal based on an uncertainty of the estimated contributions and a combiner to combine outputs of the selected sub-receivers to produce the output signal.

In some embodiments, the estimated contributions are calculated using variances of multipath component estimation noise wherein a multipath component represents characteristics of the plurality of transmission channels. The selection further includes calculating a non-binary scaling factor for each multipath component. The scaling factor is calculated using variances of multipath components and variances of zero-mean complex Gaussian variables of the multipath components. In an embodiment, the scaling factor is calculated by analyzing signal-to-noise ratio (SNR) for channel impulse responses of the multipath components.

In one example, the expected contributions are calculated by calculating $E[|h_i|^2|g_i]$ where $h_i$ is the i-th multipath component and $g_i$ is the i-th estimated multipath component. In another example, the expected contributions are calculated based on channel statistics.

In another embodiment, a method of processing an input signal in a receiver having a plurality of sub-receivers is disclosed. The method includes receiving versions of the input signal through the plurality of sub-receivers, selecting one or more of the plurality of sub-receivers using expected contributions to SNR of an output signal based on an uncertainty of the estimated contributions and combining outputs of the selected sub-receivers to produce the output signal.

In some embodiments, the estimated contributions are calculated using variances of estimation noise of the plurality of transmission channels. The selection further includes calculating a non-binary scaling factor of each of the plurality of transmission channels. In one example, the scaling factor is calculated using variances of multipath component estimation noise and variances of zero-mean complex Gaussian variables of the multipath components. In another example, the scaling factor is calculated by analyzing SNR for channel impulse responses of the plurality of transmission channels.

In one example, the expected contributions are calculated by calculating $E[|h_i|^2|g_i]$ where $h_i$ is the i-th multipath component and $g_i$ is the i-th estimated multipath component. In another example, the expected contributions are calculated based on channel statistics.

In yet another embodiment, a non-transitory computer readable medium having programming instructions which when executed by a processor perform an operation of processing an input signal in a receiver having a plurality of sub-receivers. The operation includes receiving versions of the input signal through the plurality of sub-receivers, selecting one or more of the plurality of sub-receivers using expected contributions to SNR of an output signal based on an uncertainty of the estimated contributions and combining outputs of the selected sub-receivers to produce the output signal. In some examples, the estimated contributions are calculated using variances of noise estimates of the plurality of transmission channels. The selection further includes calculating a non-binary scaling factor of each of the plurality of transmission channels. In one example, the scaling factor is calculated using variances of multipath component estimation noise and variances of zero-mean complex Gaussian variables of the multipath components. In one example, the expected contributions are calculated by calculating $E[|h_i|^2|g_i]$ where $h_i$ is the i-th multipath component and $g_i$ is the i-th estimated multipath component. In another example, the expected contributions are calculated based on channel statistics.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

When time delayed (may also be phased delayed) signals are received through a plurality of sub-receivers in a radio receiver, the received signals are processed and at least some of them are combined to increase the signal-to-noise ratio (SNR) of the received signal. As described above, an improper combination of input signals received through various sub-receivers may actually reduce SNR. Embodiments described below include systems and methods for reducing a received signal (e.g., a signal received through a sub-receiver) in magnitude when the channel energy expected for the corresponding delay is smaller, or when the channel impulse response uncertainty about the received signal is higher.

In order to reduce the magnitude, a multiplication factor must first be calculated. The description below sets forth equations that can be used for calculating these multiplication factors.

In some embodiments, the received signals that are relatively small in magnitude are made even smaller so that these sub-receivers are not selected during sub-receiver selection for the purpose of combining received signals from multiple sub-receivers.

Figure 2:
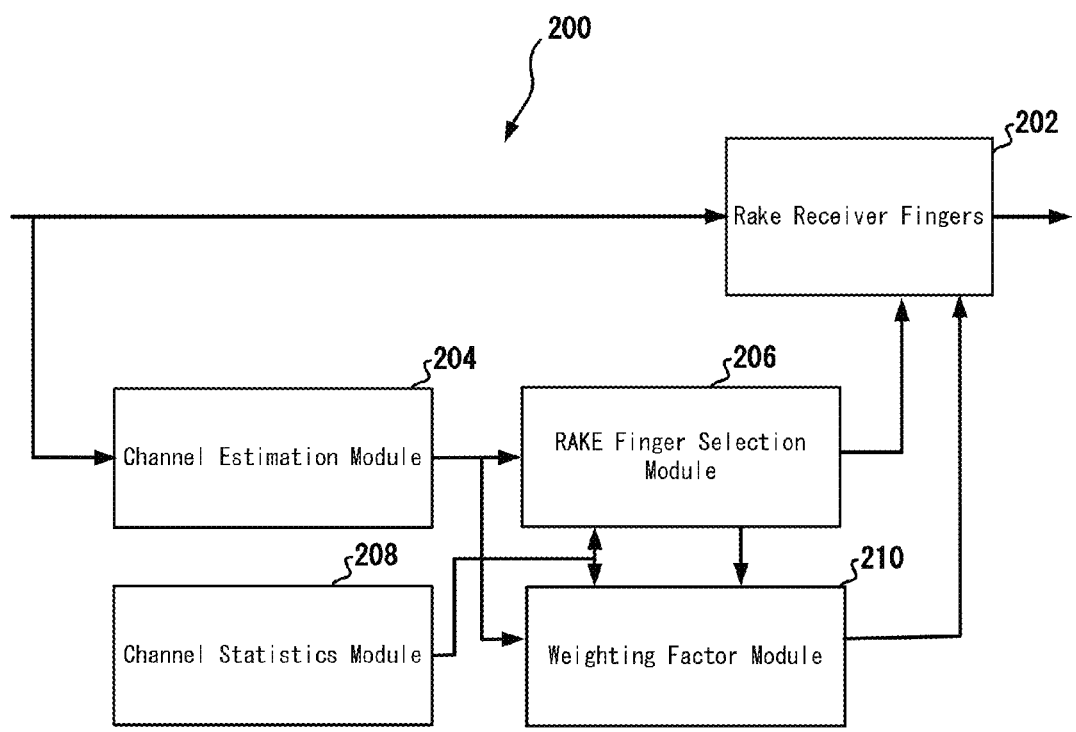
FIG. 2 illustrates an schematic of a RAKE receiver in accordance with one embodiment of the present disclosure.

FIG. 2 shows a schematic of a RAKE receiver 200. A detailed circuit or internal diagram of RAKE receiver 200 is being omitted so as not to obfuscate the disclosure. For example, the RAKE receiver 200 may include a memory and a processor, which are not shown. The RAKE receiver may include a correlator, a phase rotator, a delay equalizer and a plurality of RAKE fingers 202. The RAKE receiver 200 includes a channel estimation module 204, a channel statistics module 208 and a RAKE finger selection module 206. The RAKE receiver 200 may also include a weighting factor module 210. These modules may reside in the memory of the RAKE receiver 200 as programming instructions which when executed by the processor cause the methods described below to be executed.

The channel statistics module 208 collects channel statistics of RAKE receiver channels and these channel statistics are used in the RAKE finger selection process. In some embodiments, the channel statistics may be supplied by external entities. In summary, the channel statistics include channel characteristics under different known environments and topologies such as indoor, outdoor, urban area, rural areas, weather conditions, etc. The channel statistics may include data that defines changes that are known to occur in a received signal due to environment and reflections from different objects around a transmitter and a receiver. The embodiments described herein make use of the channel statistics and the amount of estimation uncertainty. The estimation uncertainty is modelled using an Additive White Gaussian (AWG) source for the estimation noise, i.e., for the i-th multipath component $h_i$, the estimated multipath component (or channel estimate) $g_i$ is:

$$g_i = h_i + m_i, \text{ for } i \in \{0, 1, \ldots, L_{max}-1\}$$

Where $L_{max}$ is the total number of multipath components and $m_i$ is a zero-mean complex Gaussian variable with variance $\sigma_m^2$ representing the uncertainty of the channel estimate. The value of $\sigma_m^2$ indicates the amount of uncertainty (Impact of Channel Estimation on Ultra-Wideband System Design, IEEE Journal of Selected Topics in Signal Processing, Vol. 1, No. 3, pp. 498-507, October 2007) and is related to SNR as follows:

$$\sigma_m^2 = 1/(M \text{ SNR}) \text{ where } M \text{ represents the estimation effort}$$

Note that the term multipath component represents the characteristics of a receiver channel. The signals from the transmitter (not shown) reach the RAKE receiver 200 in plurality. In simple terms, a signal may reach the RAKE receiver 200 directly without interacting with any object on the signal path. Another version of the signal may interact with an object (e.g., a building, a tree, etc.) on the way and may be received time delayed at the RAKE receiver 200. Such interactions with the environment and geographical topology between a transmitter and the RAKE receiver 200 may introduce phase changes, attenuation and delay in at least some versions of the transmitted signals that are received at the RAKE receiver 200. Multipath components $h_1$ and their associated variables such as estimates $g_i$, are complex variables that encapsulate these changes in signals.

From the channel statistics, a probability density function can be derived. The channel statistics represent channel realizations for specific topologies and environments. In some embodiments, these statistics may be updated and refined by the RAKE receiver 200. Zero mean complex Gaussian distributions for individual multipath components are used from which variance can be derived as a function of the path delay. The exponential channel has an exponential decay of the variance (Evaluating the Performance of $HR_b$ Proposals in the Presence of Multipath, Halford et. al, IEEE802.11-00/282r1, September 2000).

Figure 1:
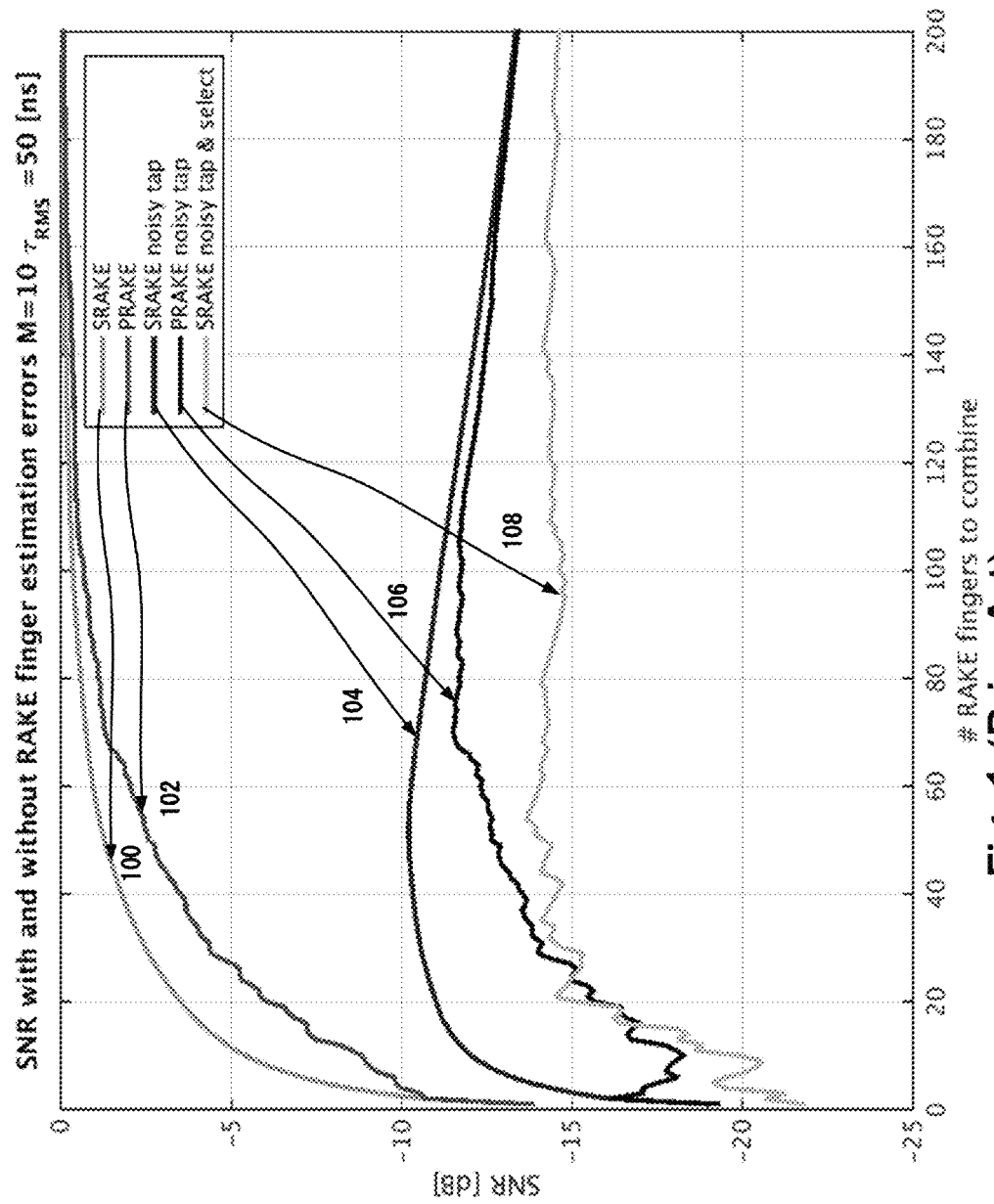
FIG. 1 depicts sample comparative graphs to show a relationship between signal-to-noise ratios (SNR) of outputs of conventional RAKE receivers.

Even though multipath components $h_i$ are not known, noisy observations $g_i$ (e.g., multipath component estimates) based on channel estimation techniques (e.g. training during preamble) are known. Prior solutions typically use $g_i$ and, as explained in the description of FIG. 1, using channel estimates alone produces sub-optimal results. In one or more embodiments, channel statistics are used in conjunction with channel estimates for a better RAKE finger selection. The selection of multipath components is made based on the expected value $E[|h_i|^2|g_i]$ (expected value of $h^2$ for a given g that can be calculated using average of probability density function), which is the expected contribution of a multipath component. If for the i-th multipath component $h_i$ is a zero-mean complex Gaussian variable with variance $\sigma_{h_i}^2$, then aforementioned expected value is represented as:

$$E[|h_i|^2 \mid g_i] = \frac{\sigma_{h_i}^2 \sigma_m^2}{\sigma_{h_i}^2 + \sigma_m^2} + \left(\frac{\sigma_{h_i}^2}{\sigma_{h_i}^2 + \sigma_m^2}\right)^2 |g_i|^2,$$

Where $\sigma_m^2$ is the variance of the channel estimation noise. As evident from the above expression, for taps with small $\sigma_{h_i}^2$ the estimated value $|g_i|^2$ is more attenuated than for taps with a large $\sigma_{h_i}^2$. In an exponential channel model, variances $\sigma_{h_i}^2$ are decaying exponentially such that for multipath components with a same estimated $|g_i|^2$ the one occurring earlier in the channel impulse response gets priority over the ones that are present later in the channel impulse response.

Both $h_i$ and $g_i$ are complex valued variables. $m_i$ is the channel estimation noise of the i-th multipath reflection coefficient. In some embodiments pertaining to I/Q receivers, for ease of calculations, the following assumptions can be used in calculations:

$g_i = h_i + m_i$;

$h_i = h_I + jh_Q$;

$m_i = m_I + jm_Q$;

$g_i = g_I + jg_Q$

In above equations, j=sqrt(−1). "I" indicates the "in-phase" or real component and "Q" indicates the "quadrature" or imaginary component of a complex value or function.

The variables $h_i$ and $h_Q$ are assumed to be independent and identically distributed (i.i.d.) Gaussian variables with variance $\sigma_h^2/2$ and $m_I$ and $m_Q$ are assumed to be i.i.d. Gaussian variables with variance $\sigma_m^2/2$. Hence, the expected contribution can be expressed as follows:

$$E[|h_i|^2 \mid g_i] = E[h_I^2 + h_Q^2 \mid g_i],$$
$$= E[h_I^2 \mid g_i] + E[h_Q^2 \mid g_i],$$
$$= E[h_I^2 \mid g_I] + E[h_Q^2 \mid g_Q].$$

To ease the notation further, the indices I and Q can be skipped and real valued variables h, g and m can be used, which can represent both in-phase (real or I) as well as the quadrature (imaginary or Q) part. The joint distribution of h and m can be represented by:

$$p(h, m) = \frac{1}{\sqrt{\pi}\,\sigma_h} \frac{1}{\sqrt{\pi}\,\sigma_m} e^{-h^2/\sigma_h^2} e^{-m^2/\sigma_m^2}$$

For a given observation g=h+m, the conditional probability density function of h can be determined as follows:

$$p(h \mid g) = \frac{p(h, m = g - h)}{\int p(h, m = g - h) dh},$$

Where $$p(h, m = g - h) = \frac{1}{\sqrt{\pi}\,\sigma_h} \frac{1}{\sqrt{\pi}\,\sigma_m} e^{-h^2/\sigma_h^2} e^{-(h-g)^2/\sigma_m^2},$$

$$= \frac{1}{\pi \sigma_h \sigma_m} e^{-\left(h^2\left(\frac{1}{\sigma_h^2} + \frac{1}{\sigma_m^2}\right) - 2hg\frac{1}{\sigma_m^2} + g^2\frac{1}{\sigma_m^2}\right)},$$

$$= \frac{1}{\pi \sigma_h \sigma_m} e^{-g^2 \frac{\sigma_m^2 - \sigma_T^2}{\sigma_m^4}} e^{-\frac{1}{\sigma_T^2}\left(h - g\frac{\sigma_T^2}{\sigma_m^2}\right)^2},$$

And $$\sigma_T^2 = \frac{\sigma_h^2 \sigma_m^2}{\sigma_h^2 + \sigma_m^2}$$

Hence, $$p(h \mid g) = \frac{1}{\sqrt{\pi}\,\sigma_T} e^{-\frac{1}{\sigma_T^2}\left(h - g\frac{\sigma_T^2}{\sigma_m^2}\right)^2},$$

Now, $E[|h_i|^2|g_i]$ can be determined as follows:

$$E[h^2 \mid g] = \int_{-\infty}^{\infty} h^2 p(h \mid g)\, dh$$

$$= \frac{1}{\sqrt{\pi}\,\sigma_T} \int_{-\infty}^{\infty} h^2 e^{-\frac{1}{\sigma_T^2}(h-R)^2}\, dh, \; R \doteq g\frac{\sigma_T^2}{\sigma_m^2}\, dh,$$

$$= \frac{1}{\sqrt{\pi}\,\sigma_T} \int_{-\infty}^{\infty} (x+R)^2 e^{-\frac{x^2}{\sigma_T^2}}\,dx, \quad x \doteq h - R$$

$$= \frac{1}{\sqrt{\pi}} \int_{-\infty}^{\infty} (y^2 \sigma_T^2 + 2y\sigma_T R + R^2) e^{-y^2}\,dy, \quad y \doteq x/\sigma_T$$

$$= \frac{1}{\sqrt{\pi}} \left[ \sigma_T^2 \int_{-\infty}^{\infty} y^2 e^{-y^2}\,dy + 2\sigma_T R \int_{-\infty}^{\infty} y e^{-y^2}\,dy + R^2 \int_{-\infty}^{\infty} e^{-y^2}\,dy \right],$$

$$= \frac{1}{\sqrt{\pi}} \left[ \sigma_T^2 \frac{1}{2}\sqrt{\pi} + R^2 \sqrt{\pi} \right],$$

$$= \frac{1}{2}\sigma_T^2 + \left(\frac{\sigma_h^2}{\sigma_h^2 + \sigma_m^2}\right)^2 g^2$$

The results for real and imaginary parts can be combined to obtain:

$$E[|h_i|^2 \mid g_i] = E[h_I^2 \mid g_I] + E[h_Q^2 \mid g_Q],$$

$$= \sigma_T^2 + \left(\frac{\sigma_{h_i}^2}{\sigma_{h_i}^2 + \sigma_m^2}\right)^2 |g_i|^2.$$

For complex Gaussian distributed multipath components $h_i$, $E[|h_i|^2|g_i]$ can be expressed in $2^{nd}$ order statistics of their distributions. When the probability density function is not known or not equal to the complex Gaussian distribution, in some embodiments, the RAKE finger selection procedure is still performed based on $2^{nd}$ order statistics.

It should be noted that these equations may be programmed into the programming instructions that reside in the memory of the RAKE receiver 200. Alternatively, in some embodiments, the RAKE finger selection module 206 and the weighting factor module 210 may have their own processors and memory separate from the processor and the memory of the RAKE receiver 200. In those embodiments, the programming instructions to solve the given equations reside in the memories of the RAKE finger selection module 206 and/or the weighting factor module 210. In some other embodiments, if the RAKE finger selection module 206 and/or the weighting factor module 210 include separate processors and memory, these processors may collaborate with the processor of the RAKE receiver 200.

In some embodiments, in addition to the selection of RAKE fingers using methods described above, a scaling factor $\alpha_i$ for each of the selected RAKE fingers is calculated and used for a finer selection of multipath components or RAKE fingers. Traditionally, a binary weighting is applied, e.g., $\alpha_i=1$ for a multipath component h to be incorporated in the RAKE finger selection process and $\alpha_i=0$ to discard a multipath component from the RAKE finger selection process. However, in some embodiments described herein, instead of a binary weighting, a fractional scaling factor of the i-th multipath component $h_i$ is used. The expected value $E[|h_i|g_i]$ can be used for determining an appropriate weighting factor. For complex Gaussian distributed multipath component $h_i$:

$$E[h \mid g] = \int_{-\infty}^{\infty} h p(h \mid g)\,dh$$

$$= \int_{-\infty}^{\infty} h p(h \mid g)\,dh$$

$$= \frac{1}{\sqrt{\pi}\,\sigma_T} \int_{-\infty}^{\infty} h e^{-\frac{1}{\sigma_T^2}(h-R)^2}\,dh,$$

$$= R,$$

$$= g \frac{\sigma_T^2}{\sigma_m^2}$$

$$E[h_i \mid g_i] = \frac{\sigma_{h_i}^2}{\sigma_{h_i}^2 + \sigma_m^2} g_i$$

Hence the scaling factor $\alpha_i$ can be represented as:

$$\alpha_i = \frac{\sigma_{h_i}^2}{\sigma_{h_i}^2 + \sigma_m^2}$$

In another embodiment, the scaling factor may be determined based on an analysis of SNR for a given channel impulse response as a function of scaling factors. An optimal weighting factor may be represented as follows:

$$\alpha_{i,opt} = \frac{|h_i|^2}{\left(1 + \frac{1}{M}\right)|h_i|^2 + \sigma_m^2}$$

However, since $h_i$ is not known, $g_i$ is used in the first approximation, as follows:

$$\alpha_i = \frac{|g_i|^2}{\left(1 + \frac{1}{M}\right)|g_i|^2 + \sigma_m^2}$$

In another approximation, $E[|h_i|^2|g_i]$ is used instead of $|h_i|^2$. Accordingly:

$$\alpha_i = \frac{E[|h_i|^2 \mid g_i]}{\left(1 + \frac{1}{M}\right)E[|h_i|^2 \mid g_i] + \sigma_m^2}$$

In some embodiments, $\alpha_i$ may also be derived as follows:

$$\alpha_i = E\left[\frac{|h_i|^2}{\left(1 + \frac{1}{M}\right)|h_i|^2 + \sigma_m^2} \,\bigg|\, g_i\right].$$

Factoring non-binary weighting of RAKE fingers, as described above, leads to better SNR using a smaller number of RAKE fingers. For optimal weighting of RAKE fingers, for a given channel realization, the optimal allocation vector can be found by analyzing the decision statistics U when a symbol X is transmitted. In a finger, the received value is $R_i = Xh_i + n_i$ and the estimated multipath component for this finger is $g_i = h_i + m_i$. The noise on the channel $n_i$ is AWGN and the estimation noise $m_i$ is also AWGN. Accordingly, the decision statistics can be represented as follows:

$$U = \sum_{i=0}^{L-1} \alpha_i R_i g_i^*,$$

$$= \sum_{i=0}^{L-1} \alpha_i R_i (h_i^* + m_i^*),$$

$$= \sum_{i=0}^{L-1} \alpha_i (Xh_i + n_i)(h_i^* + m_i^*),$$

$$= \sum_{i=0}^{L-1} \alpha_i (X|h_i|^2 + Xh_i m_i^* + n_i h_i^* + n_i m_i^*),$$

The noise part $U_n$ and the signal part $U_s$ can be distinguished as follows:

$$U_n = \sum_{i=0}^{L-1} \alpha_i (Xh_i m_i^* + n_i h_i^* + n_i m_i^*)$$

$$U_s = X \sum_{i=0}^{L-1} \alpha_i |h_i|^2$$

The expected noise power is:

$$E[|U_n|^2] = \sum_{i=0}^{L-1} \alpha_i^2 (X^2 |h_i|^2 \sigma_m^2 + |h_i|^2 \sigma_n^2 + \sigma_n^2 \sigma_m^2)$$

While the signal power is:

$$|U_s|^2 = X^2 \left( \sum_{i=0}^{L-1} \alpha_i |h_i|^2 \right)^2$$

The weighting factor $\underline{\alpha}$ should be chosen such that the average SNR of the decision variable U is maximal. The SNR for the RAKE receiver 200 with weighting of the RAKE fingers can be represented as:

$$SNR_{WRAKE}(L) = \frac{\left( \sum_{i=0}^{L-1} \alpha_i |h_i|^2 \right)^2 SNR_0}{\sum_{i=0}^{L-1} \alpha_i^2 \left[ \left( 1 + \frac{1}{M} \right) |h_i|^2 + \sigma_m^2 \right]}$$

Where $$SNR_0 = \frac{X^2}{\sigma_n^2} \text{ and } \sigma_m^2 = \frac{1}{M} \frac{1}{SNR_0}$$

Using vector notations, the SNR of the RAKE receiver 200 can be represented by:

$$SNR_{WRAKE}(L) = \frac{(\underline{a}^T \underline{\alpha})^2}{\underline{\alpha}^T \Gamma \underline{\alpha}} SNR_0$$

Where $\underline{a}$ is a vector with elements $a_i = |h_i|^2$ and $\Gamma$ is a diagonal matrix with diagonal elements:

$$\gamma_i = \left( 1 + \frac{1}{M} \right) |h_i|^2 + \sigma_m^2$$

Accordingly, the optimal allocation vector is:

$$\underline{\alpha}_{opt} = \Gamma^{-1} \underline{a}$$

And the optimal SNR for this weighted RAKE (WRAKE) solution is equal to:

$$SNR_{WRAKE,opt}(L) = SNR_0 (\underline{a}^T \Gamma^{-1} \underline{a}),$$

$$= SNR_0 \sum_{i=0}^{L-1} \frac{|h_i|^4}{\left( 1 + \frac{1}{M} \right) |h_i|^2 + \sigma_m^2}$$

And the optimal weighting coefficients are:

$$\alpha_{i,opt} = \frac{|h_i|^2}{\left( 1 + \frac{1}{M} \right) |h_i|^2 + \sigma_m^2}$$

The methods described herein have various applications in which a receiver receives information from several sources and combines the incoming signals from the plurality of sources. Through the analysis of the plurality of channels as described, the most promising sources of information (i.e., channels) can be selected. In addition a weighting factor that takes into account channel imperfections can be used to further refine the channel selection for optimal SNR.

Figure 3:
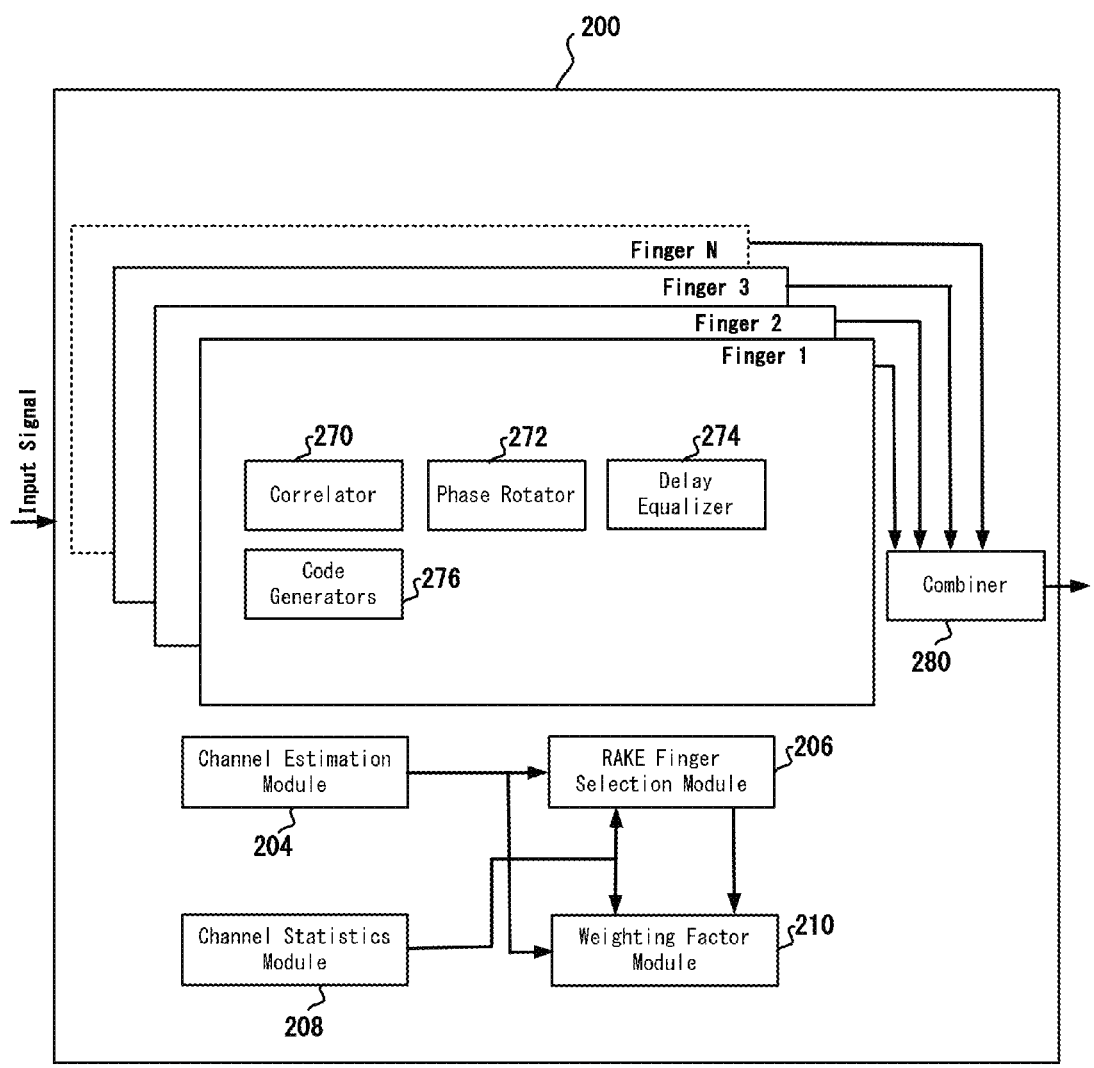
FIG. 3 illustrates an schematic of a RAKE receiver in accordance with one embodiment of the present disclosure.

FIG. 3 depicts a schematic of the RAKE receiver 200. As illustrated, the RAKE receiver 200 includes RAKE fingers 1 . . . N, a combiner 280 for combining outputs of some or all these RAKE fingers after adjusting their outputs according to the methods described above, the channel estimation module 204, the channel statistics module 208, the RAKE finger selection module 206 and the weighting factor module 210.

A RAKE finger (e.g., the finger 1) may include a correlator 270 for selecting multipath components, a phase rotator 272, a code generator 276 and a delay equalizer 274. Some transmitted signals may arrive at the RAKE receiver 200 through reflections from objects between the transmitter and the RAKE receiver 200. Such reflections may cause a phase change in the signal. The phase rotator 272 adjusts the phase of an incoming signal. Similarly, some of the incoming signal may have a delay which is adjusted by the delay equalizer 274. The code generators 276 are provided to generate correlating codes.

Figure 4:
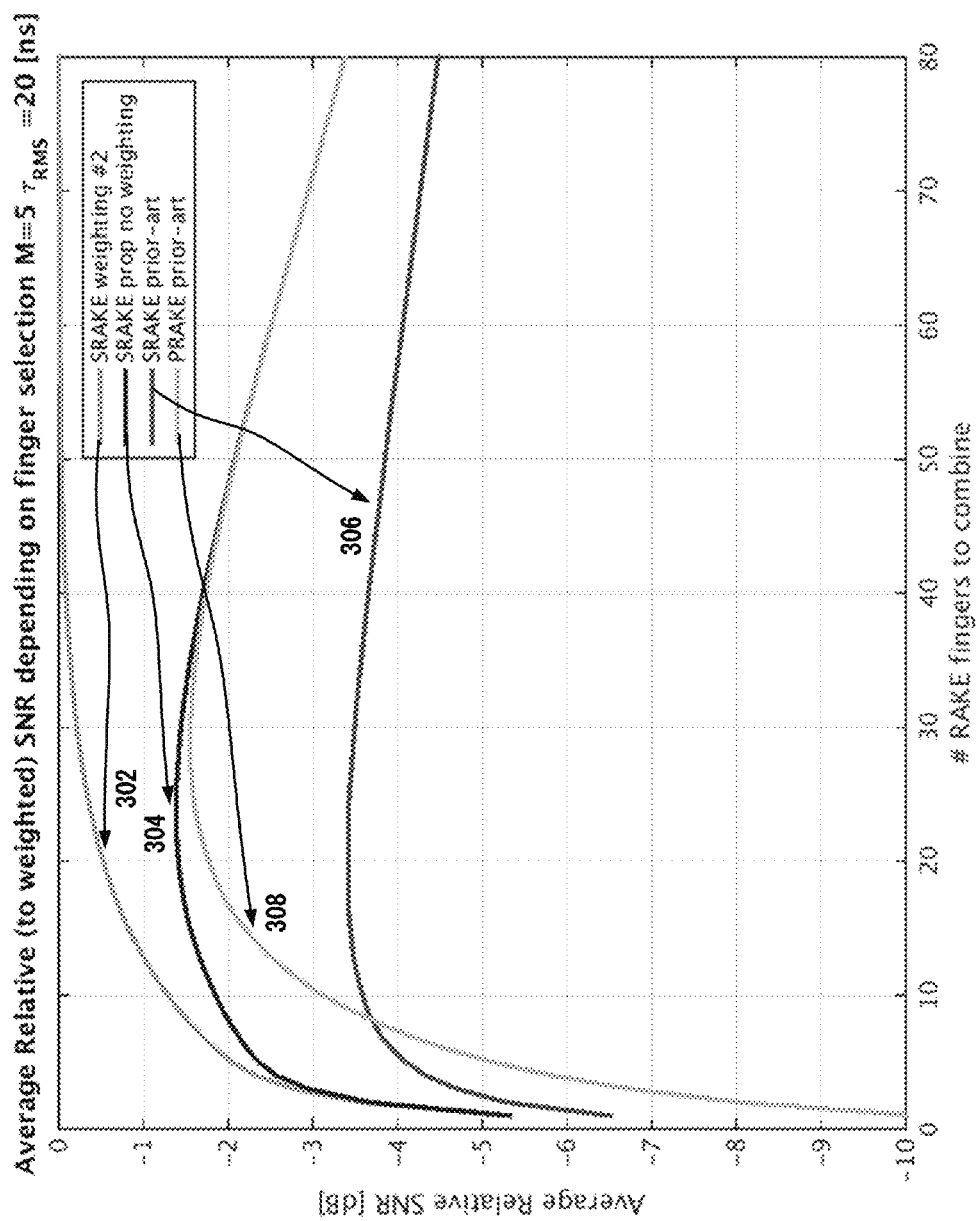
FIG. 4 depicts sample comparative graphs to show a relationship between signal-to-noise ratios (SNR) of outputs of a RAKE receiver according to the embodiments of the present disclosure and conventional RAKE receivers.

FIG. 4 illustrates a sample comparative output graph in which the line 302 represents the output of the combiner 280 when both the estimated contribution of multipath components as described above and weighting of the multipath components, as described above, are applied in the finger selection process. As evident, optional SNR is achieved using the smallest amount of RAKE fingers. The line 304 signifies the output when the estimated contribution of multipath components, as described above, is applied but weighting of the multipath components is not used in the process of finger selection. The lines 306, 308 signifies an output using conventional techniques.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A receiver configured to receive an input signal, comprising:
   a processor;
   a memory;
   a plurality of sub-receivers configured to receive a plurality of versions of the input signal through a plurality of transmission channels;
   a sub-receiver selection module configured to select one more of the plurality of sub-receivers using expected contributions to signal-to-noise (SNR) of an output signal, wherein the selection further includes calculating a fractional scaling factor based upon a variance for a particular multipath component divided by the variance for the particular multipath component added to a variance of the channel estimation noise; and
   a combiner configured to combine weighted outputs of the selected sub-receivers to produce the output signal based upon the fractional scaling factor.

2. The receiver of claim 1, wherein the fractional scaling factor is calculated using variances of multipath components and variances of zero-mean complex Gaussian variables of the multipath components.

3. The receiver of claim 1, wherein the fractional scaling factor is calculated by analyzing signal-to-noise ratio (SNR) for channel impulse responses of the multipath components.

4. The receiver of claim 1, wherein the expected contributions are calculated by calculating $E[|h_i|^2|g_i]$ where $h_i$ is i-th multipath component and $g_i$ is i-th estimated multipath component.

5. The receiver of claim 4, wherein the expected contributions are calculated based on channel statistics.

6. A method of processing an input signal in a receiver having a plurality of sub-receivers, the method comprising:
   receiving versions of the input signal through the plurality of sub-receivers;
   selecting one or more of the plurality of sub-receivers using expected contributions to signal-to-noise (SNR) of an output signal based on an uncertainty of the estimated contributions calculated using variances of multipath component estimation noise, wherein a multipath component represents characteristics of the plurality of transmission channels;
   calculating a fractional scaling factor based upon a variance for a particular multipath component divided by the variance for the particular multipath component added to a variance of the channel estimation noise; and
   combining outputs of the selected sub-receivers to produce the output signal.

7. The method of claim 6, wherein the fractional scaling factor is calculated using variances of multipath component estimation noise and variances of zero-mean complex Gaussian variables of the multipath components.

8. The method of claim 6, wherein the fractional scaling factor is calculated by analyzing signal-to-noise ratio (SNR) for channel impulse responses of the plurality of transmission channels.

9. The method of claim 6, wherein the expected contributions are calculated by calculating $E[|h_i|^2|g_i]$ where $h_i$ is i-th multipath component and $g_i$ is i-th estimated multipath component.

10. The method of claim 9, wherein the expected contributions are calculated based on channel statistics.

11. A non-transitory computer readable medium having programming instructions which when executed by a processor perform an operation of processing an input signal in a receiver having a plurality of sub-receivers, the operation comprising:
    receiving versions of the input signal through the plurality of sub-receivers;
    selecting one or more of the plurality of sub-receivers using expected contributions to signal-to-noise (SNR) of an output signal based on an uncertainty of the estimated contributions calculated using variances of multipath component estimation noise, wherein a multipath component represents characteristics of the plurality of transmission channels;
    calculating a fractional scaling factor based a variance for a particular multipath component divided by the variance for the particular multipath component added to a variance of the channel estimation noise; and
    combining outputs of the selected sub-receivers to produce the output signal.

12. The non-transitory computer readable medium of claim 11, wherein the fractional scaling factor is calculated using variances of multipath component estimation noise and variances of zero-mean complex Gaussian variables of the multipath components.

13. The non-transitory computer readable medium of claim 11, wherein the expected contributions are calculated by calculating $E[|h_i|^2|g_i]$ where $h_i$ is i-th multipath component and g is i-th estimated multipath component.

14. The non-transitory computer readable medium of claim 11, wherein the expected contributions are calculated based on channel statistics.

* * * * *